UNITED STATES PATENT OFFICE.

WILHELM HERZBERG, OF BERLIN-WILMERSDORF, AND OSWALD SCHARFENBERG, OF BERLIN-SCHÖNEBERG, GERMANY, ASSIGNORS TO ACTIEN GESELLSCHAFT FÜR ANILIN FABRIKATION, OF BERLIN, GERMANY.

ORTHOOXYAZO DYES FOR WOOL.

1,408,296.     Specification of Letters Patent.     Patented Feb. 28, 1922.

No Drawing.     Application filed August 30, 1921. Serial No. 496,969.

*To all whom it may concern:*

Be it known that we, WILHELM HERZBERG and OSWALD SCHARFENBERG, citizens of the German Republic, residing at Berlin-Wilmersdorf, Germany, and Berlin-Schöneberg, Germany, our P. O. address being Prinzregentenstr. 10, Berlin-Wilmersdorf, Germany, and Rosenheimerstr. 12, Berlin-Schöneberg, Germany, have invented certain new and useful Improvements in Orthooxyazo Dyes for Wool, (for which we have made applications in Germany Aug. 28, 1917, Jan. 18, 1918, April 22, 1918; in Italy June 7, 1920; in England June 8, 1920; in Czecho-Slovakia June 17, 1920; in Switzerland July 8, 1920, and in France June 19, 1920,) of which the following is a specification.

By our invention by combining a diazotized 2-amino-phenol derivative which contains negative radicals such as halogen, nitro-group with 8-halogen-1-oxynaphthalene-5-sulfonic acid new valuable dyestuffs for wool are produced the chromium lakes having a very good fastness.

They form in the dry pulverized state dark powders soluble in water to a violet solution and are insoluble in alcohol, ether, benzene, being destroyed by strong reducing agents and dyeing on wool with chromium mordants black to greenish black tints. The following example illustrates our invention the parts being by weight:

18.9 parts of 2-amino-4-nitro-6-chloro-1-oxybenzene are diazotized by means of 6.9 parts of sodium nitrite and 50 parts of hydrochloric acid of 12° Bé specific gravity. The diazo compound is coupled with 26 parts of 8-chloro-1-oxynaphthalene-5-sulfonic acid in a solution containing sodium carbonate. The dyestuff is separated and worked up in the usual manner. It dyes wool with chromium mordants black tints of a very good fastness.

It is obvious to those skilled in the art that our invention is not limited to the foregoing example or the details given therein. Similar dyes may be obtained by substitution for the parent material in the example other compounds within the foregoing definition.

What we claim is:—

1. The herein described new ortho-oxyazo dyes being in the shape of alkali metal salts dark powders soluble in water to reddish violet solutions from which an inorganic or organic acid separates a yellowish red precipitate, the aqueous solution becoming red violet by addition of sodium, red by addition of sodium hydroxide, yielding upon reduction 8-chloro-2-amino-1-oxynaphthalene-5-sulfonic acid and a 2-amino-1-oxybenzene derivative, dyeing on wool with chromium mordants black to greenish black tints and corresponding as free acids to the general formula:

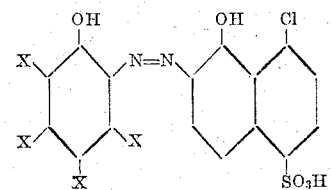

X meaning univalent substituents such as hydrogen, alkyl, halogen, nitro, at least one of these substituents being a negative group such as halogen, nitro.

2. The herein described new ortho-oxyazo dyes being in the shape of alkali metal salts dark powders soluble in water to reddish violet solutions from which an inorganic or organic acid separates a yellowish red precipitate, the aqueous solution becoming red violet by addition of sodium carbonate, red by addition of sodium hydroxide, yielding upon reduction 8-chloro-2-amino-1-oxynaphthalene-5-sulfonic acid and a 2-amino-1-oxybenzene derivative, dyeing on wool with chromium mordants black to greenish black tints and corresponding as free acids to the general formula:

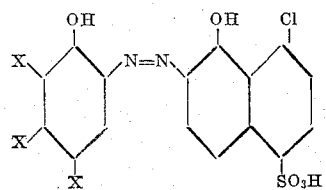

X meaning univalent substituents such as hydrogen, alkyl, halogen, nitro, at least one of these substituents being a negative group such as halogen, nitro.

3. The herein described new ortho-oxyazo dyes being in the shape of alkali metal salts dark powders soluble in water to reddish violet solutions from which an inorganic or organic acid separates a yellowish red precipitate, the aqueous solution becoming red violet by addition of sodium carbonate, red by addition of sodium hydroxide, yielding upon reduction 8-chloro-2-amino-1-oxynaphthalene-5-sulfonic acid and a 2-amino-1-oxybenzene derivative, dyeing on wool with chromium mordants black to greenish black tints of a very good fastness and corresponding as free acids to the general formula:

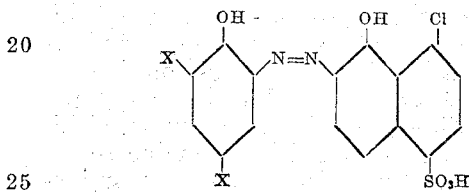

X meaning a negative group such as halogen, nitro.

4. The herein described new ortho-oxyazo dyes being in the shape of alkali metal salts dark powders soluble in water to reddish violet solutions from which an inorganic or organic acid separates a yellowish red precipitate, the aqueous solution becoming red violet by addition of sodium carbonate, red by addition of sodium hydroxide, yielding upon reduction 8-chloro-2-amino-1-oxynaphthalene-5-sulfonic acid and a 2.4-diamino-6-halogenated 1-oxybenzene derivative, dyeing on wool with chromium mordants black tints and corresponding as free acids to the general formula:

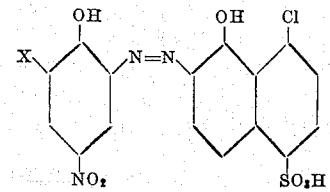

X meaning halogen.

5. The herein described new ortho-oxyazo dye being in the shape of alkali metal salt a dark powder soluble in water to a reddish violet solution from which an inorganic or organic acid separates a yellowish red precipitate, the aqueous solution becoming red violet by addition of sodium carbonate, red by addition of sodium hydroxide, yielding upon reduction 8-chloro-2-amino-1-oxynaphthalene-5-sulfonic acid and 2.4-diamino-6-chloro-1-oxybenzene derivative, dyeing on wool with chromium mordants blacks tints and corresponding as free acid to the formula:

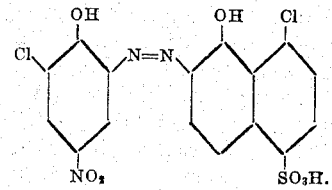

In testimony whereof we affix our signatures in presence of two witnesses.

WILHELM HERZBERG.
OSWALD SCHARFENBERG.

Witnesses:
  Dr. GERHARD HOPPE,
  Dr. RUDOLF HANGWITZ.